(12) United States Patent
Watanabe et al.

(10) Patent No.: US 7,622,218 B2
(45) Date of Patent: Nov. 24, 2009

(54) ELECTRODE FOR NON-AQUEOUS ELECTROLYTE SECONDARY BATTERY AND PRODUCTION METHOD THEREOF

(75) Inventors: Kozo Watanabe, Osaka (JP); Masao Fukunaga, Osaka (JP); Ichiro Yasuoka, Osaka (JP); Toshiro Kume, Osaka (JP)

(73) Assignee: Panasonic Corporation, Osaka (JP)

( * ) Notice: Subject to any disclaimer, the term of this patent is extended or adjusted under 35 U.S.C. 154(b) by 744 days.

(21) Appl. No.: 11/398,700

(22) Filed: Apr. 6, 2006

(65) Prior Publication Data

US 2006/0234115 A1  Oct. 19, 2006

(30) Foreign Application Priority Data

Apr. 13, 2005  (JP) ............... 2005-115978

(51) Int. Cl.
*H01M 4/64* (2006.01)
*H01M 10/24* (2006.01)

(52) U.S. Cl. ............. 429/94; 29/623.1; 29/623.2; 29/623.3; 29/623.4; 29/623.5; 29/2; 429/206; 429/233; 429/241; 429/242

(58) Field of Classification Search ............ 429/94, 429/206, 233, 241, 242; 29/623.1–623.5, 29/2.1–2.25
See application file for complete search history.

(56) References Cited

U.S. PATENT DOCUMENTS 6,682,848 B1 * 1/2004 Yano et al. ............. 429/206

FOREIGN PATENT DOCUMENTS

| JP | 8-7882 A | 1/1996 |
|---|---|---|
| JP | 9-283152 A | 10/1997 |
| JP | 11-73952 A | 3/1999 |
| JP | 3468847 | 9/2003 |

\* cited by examiner

*Primary Examiner*—Dah-Wei D Yuan
*Assistant Examiner*—Amanda Barrow
(74) *Attorney, Agent, or Firm*—McDermott Will & Emery LLP

(57) ABSTRACT

An electrode in sheet form includes a current collector and an electrode mixture layer carried on each side thereof. The electrode is bent in the longitudinal direction thereof, to cause a large number of cracks in at least the electrode mixture layer to be positioned on the inner side of the current collector when wound, such that the cracks extend from the surface of the electrode mixture layer to the current collector in the direction intersecting with the longitudinal direction of the electrode. This bending process includes the steps of: bending the electrode at a curvature that is smaller than that of the winding core at least once; and thereafter bending the electrode at a curvature that is equal to or larger than that of the winding core. For example, this process is performed by arranging rollers such that their diameters decrease gradually and pressing the electrode against these rollers. This invention provides an electrode that does not break when wound to form an electrode assembly.

3 Claims, 4 Drawing Sheets

ELECTRODE FOR NON-AQUEOUS ELECTROLYTE SECONDARY BATTERY AND PRODUCTION METHOD THEREOF

FIELD OF THE INVENTION

The present invention relates to an electrode for non-aqueous electrolyte secondary batteries including a wound electrode assembly and to a method for producing the electrode. More particularly, the present invention pertains to a method for producing an electrode that does not break when wound.

BACKGROUND OF THE INVENTION

With the recent proliferation of portable appliances and cordless appliances, such as cellular phones and notebook personal computers, there is an increasing demand for batteries that supply electric power to such appliances. Among them, particularly required are secondary batteries that are small and light-weight, have high energy density, and are capable of repeated charge/discharge.

Many of such secondary batteries include an electrode assembly composed of a positive electrode sheet, a negative electrode sheet, and a separator interposed between the positive and negative electrode sheets, which are spirally wound together, and the wound electrode assembly is inserted in a case. Also, the capacities of such batteries are being heightened, so attempts have been made to reduce the diameter of a winding core that is used to form a wound electrode assembly.

However, if the diameter of the winding core is reduced or the packing density of an electrode is increased to heighten the capacity, the electrode may break when wound. Specifically, in the step of winding an electrode, the electrode may break because there is a difference in tensile stress between the inner and outer sides of the wound electrode due to the thickness of the electrode.

In order to solve this problem, various proposals have been made on the step of winding electrode sheets for forming an electrode assembly. For example, Japanese Laid-Open Patent Publication No. Hei 9-283152 proposes passing an electrode plate between a roll with a low surface hardness and a roll with a high surface hardness, to cause micro-cracks in the electrode plate in the direction intersecting with the winding direction. This provides a flexible electrode for use in the wound electrode assembly of alkaline storage batteries.

Also, Japanese Laid-Open Patent Publication No. Hei 11-73952 discloses a technique applied to an electrode plate for use in cylindrical alkaline storage batteries. According to this technique, slit lines are cut in the part of an electrode plate to be positioned outward when wound, at given intervals in the direction intersecting with the winding direction. These slit lines suppress the occurrence of cracks at irregular intervals, thereby suppressing electrode breakage upon winding.

Japanese patent No. 3468847 discloses a technique of forming grid-like grooves in the semidry active material paste applied to a current collector by using an expanded metal, in order to suppress electrode breakage in the winding step.

The use of the technique of No. Hei 11-73952 for suppressing electrode breakage upon winding allows an improvement in the flexibility of electrode plates. However, the method of sandwiching an electrode plate between a roll with a low surface hardness such as a rubber roll and a roll with a high surface hardness allows the electrode plate to be bent only as much as the thickness of the electrode plate at the maximum. Thus, in the winding step, this method does not allow the electrode to be bent more than the curvature of the winding core. Also, although this method can cause micro-cracks in an electrode plate by giving a bend with a small curvature to the electrode plate, such cracks are formed at large intervals. Thus, in the winding step, when a bending force with a large curvature is applied to an electrode plate, a larger compressive stress is exerted on the inner part of the electrode plate. If cracks are formed at large intervals, such cracks cannot scatter the compressive stress sufficiently. As a result, a large stress is concentrated in one crack and the electrode plate therefore breaks upon winding.

In the technique of No. Hei 11-73952, the slit lines in the electrode have a depth of 5 to 10% of the electrode thickness. However, such depth is insufficient for the bending stress to be scattered or released upon winding. Hence, deeper cracks are unevenly produced upon winding, which may result in electrode breakage upon winding.

Further, the application of the technique of JP 3468847 permits formation of grid-like grooves that are deep enough to reach the current collector. However, since this technique uses expanded metal to form grooves, it is difficult to form grid-like grooves at very small intervals. Accordingly, the bending stress exerted on the electrode is not sufficiently scattered and the stress per one crack cannot be reduced, which may result in electrode breakage upon winding.

BRIEF SUMMARY OF THE INVENTION

In view of the problems as described above, according to the present invention, an electrode for a non-aqueous electrolyte secondary battery, which comprises a current collector and an electrode mixture layer carried on each side of the current collector, is previously subjected to a bending process to cause a large number of cracks in the electrode mixture layers. These cracks extend from the electrode mixture layer surface to the current collector in the direction intersecting with the longitudinal direction of the electrode, i.e., the direction intersecting with the winding direction of the electrode. The electrode with a large number of such cracks is wound onto a winding core together with an electrode of opposite polarity and a separator, to form an electrode assembly.

That is, a method for producing an electrode for a non-aqueous electrolyte secondary battery according to the present invention includes the steps of:

forming an electrode mixture layer on each side of a current collector, to produce an electrode in sheet form; and bending the electrode in the longitudinal direction thereof, to cause a large number of cracks in at least the electrode mixture layer on the winding core side such that the cracks extend from the surface of the electrode mixture layer to the current collector in the direction intersecting with the longitudinal direction of the electrode.

In this method, the step of bending the electrode includes the steps of:

bending the electrode at a curvature that is smaller than that of the winding core at least once; and thereafter bending the electrode at a curvature that is equal to or larger than that of the winding core.

The present invention is directed to a method for producing an electrode for a non-aqueous electrolyte secondary battery, the electrode being in sheet form and designed to be spirally wound onto a winding core together with an electrode of opposite polarity and a separator. This method includes the steps of:

forming an electrode mixture layer on each side of a current collector, to produce an electrode in sheet form; and bending the electrode in the longitudinal direction thereof by transporting the electrode in the longitudinal direction while changing the transport direction of the electrode under tension with a plurality of rollers, to cause a large number of cracks in at least the electrode mixture layer on the winding core side such that the cracks extend from the surface of the electrode mixture layer to the current collector in the direction intersecting with the longitudinal direction of the electrode.

In this method, the step of bending the electrode includes the steps of:

changing the transport direction of the electrode with at least one roller that is larger in diameter than the winding core; and thereafter changing the transport direction of the electrode with a roller that is equal to or smaller in diameter than the winding core.

In the electrode according to the present invention, as a result of such bending process of bending the electrode at a curvature that is equal to or larger than that of the winding core, at least the electrode mixture layer on the winding core side has a large number of cracks that extend from the surface of the electrode mixture layer to the current collector in the direction intersecting with the longitudinal direction of the electrode. As used herein, "the electrode mixture layer on the winding core side", refers to the electrode mixture layer of an electrode that is to be positioned on the winding core side of the current collector when the electrode is wound onto a winding core together with an electrode of opposite polarity and a separator to form an electrode assembly. As used herein, "the cracks that extend from the surface of the electrode mixture layer to the current collector" refer to cracks of the electrode mixture layer that extend from the surface of the electrode mixture layer in the direction intersecting with the longitudinal direction of the electrode and are deep enough to reach the part of the electrode mixture layer in contact with the current collector, but this does not mean that the current collector has cracks. These cracks are distributed evenly in the longitudinal direction of the electrode. Thus, when the electrode is wound onto a winding core together with an electrode of opposite polarity and a separator to form an electrode assembly, the distribution of the cracks between the initial winding position and the final winding position are basically almost uniform. Accordingly, when the electrode is wound to form an electrode assembly, new cracks do not occur and the winding stress is not concentrated in specific portions of the electrode. As a result, in the winding step, electrode breakage can be suppressed.

In the method of the present invention, the bending step for forming cracks that extend in the direction intersecting with the longitudinal direction of the electrode includes the steps of bending an electrode at a curvature that is smaller than that of the winding core; and thereafter bending the electrode at a curvature that is equal to or larger than that of the winding core. Hence, it is possible to form a large number of cracks almost uniformly in the electrode mixture layer of the electrode. Particularly, if an electrode is bent at a curvature smaller than that of the winding core a plurality of times such that the curvature increases gradually, shallow cracks produced by the first bending gradually become deeper by the subsequent bendings. Therefore, in the step of bending the electrode, the electrode is prevented from breaking.

The electrode of the present invention is previously subjected to a bending process in which the electrode is bent at a curvature that is equal to or larger than that of the winding core. As a result, it has a large number of cracks that extend from the surface of the electrode mixture layer to the current collector in the direction intersecting with the longitudinal direction of the electrode. Therefore, in the winding step for forming an electrode assembly, the electrode is prevented from breaking. Also, since the electrode mixture layer has a large number of cracks, it has an improved ability to absorb electrolyte, thereby making it possible to provide sufficient electrode characteristics.

Accordingly, it becomes possible to reduce the diameter of the winding core to increase the energy density of the battery.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The electrode of the present invention is previously subjected to a bending process in which the electrode is bent at a curvature that is equal to or larger than that of the winding core. Thus, of the electrode mixture layers carried on both sides of the current collector, at least the electrode mixture layer on the winding core side has a large number of cracks that extend from the surface of the electrode mixture layer to the current collector in the direction intersecting with the longitudinal direction of the electrode.

In a preferable embodiment of the present invention, the bending process for forming a large number of such cracks includes the steps of: bending an electrode at a curvature that is smaller than that of the winding core at least once; and thereafter bending the electrode at a curvature that is equal to or larger than that of the winding core. The step of bending an electrode at a curvature that is smaller than that of the winding core preferably includes pressing the electrode against a roller that has a diameter 50 to 200 times the thickness of the electrode.

When an electrode has a current collector thickness of 5 to 30 μm and a total thickness of 50 to 300 μm, cracks are preferably provided at intervals of 50 to 200 μm.

In another preferable embodiment of the present invention, the bending process includes the steps of: changing the transport direction of the electrode with at least one roller that is larger in diameter than the winding core; and thereafter changing the transport direction of the electrode with a roller that is equal to or smaller in diameter than the winding core.

In this case, the roller that is larger in diameter than the winding core is a roller having a diameter 100 to 1000 times the thickness of the electrode.

Figure 1:
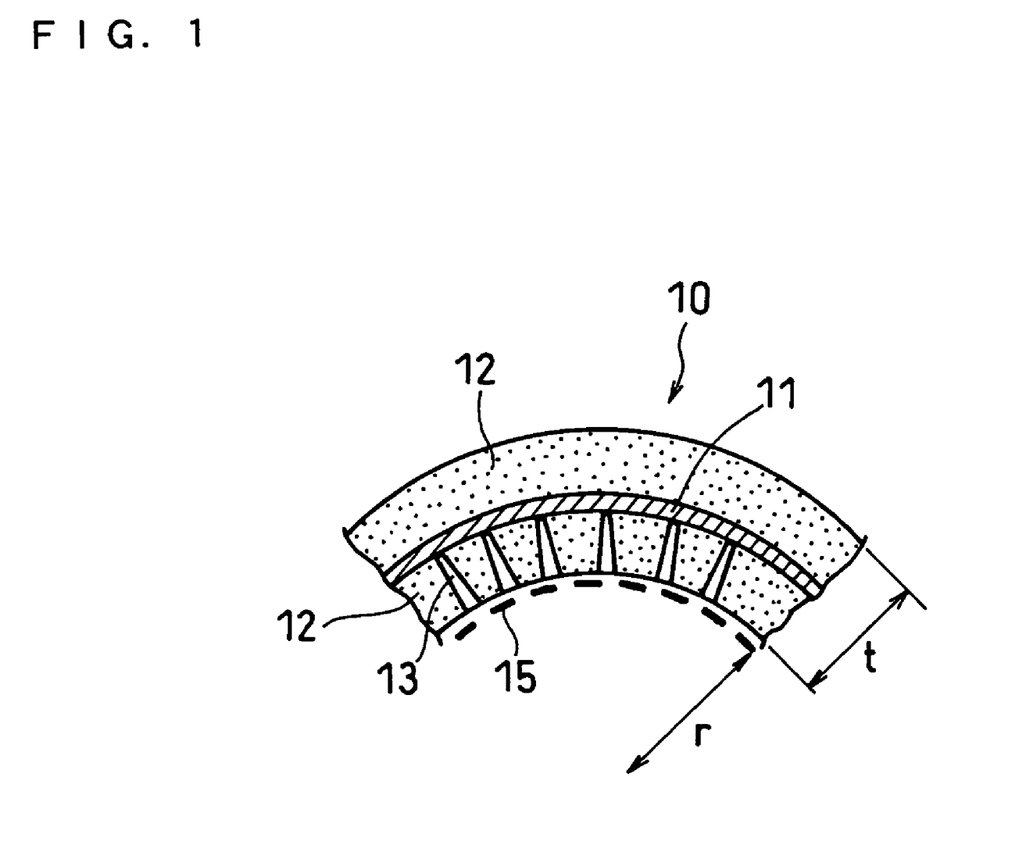
FIG. 1 is a cross-sectional view of the main part of an electrode in one embodiment of the present invention.

FIG. 1 is a cross-sectional view of the main part of an electrode in one embodiment of the present invention. An electrode 10 includes a current collector 11 made of metal foil and an electrode mixture layer 12 carried on each side thereof. This electrode is designed to be wound onto a winding core 15, and at least the electrode mixture layer on the inner side of the current collector 11, i.e., on the winding core side, has a large number of cracks 13. The cracks 13 are formed by bending the electrode 10 in the longitudinal direction thereof. More specifically, they are formed by bending the electrode at a curvature that is smaller than that of the winding core 15 at least once, and then bending it at a curvature that is equal to or larger than that of the winding core 15.

Figure 5A:
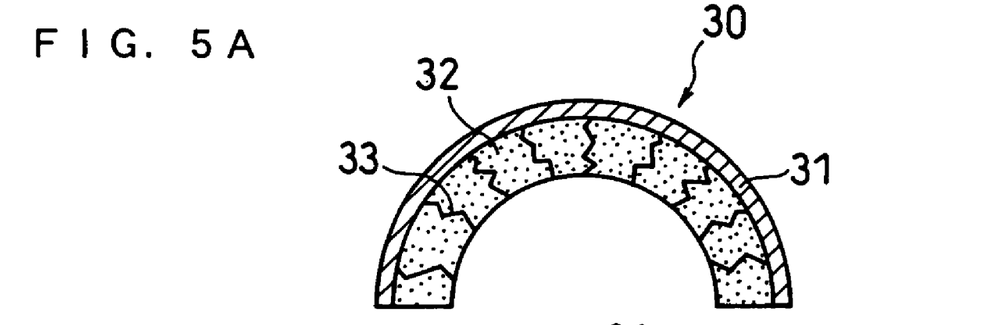
FIG. 5A is a schematic cross-sectional view of an electrode of the present invention that has been subjected to a bending process before winding.
Figure 5B:
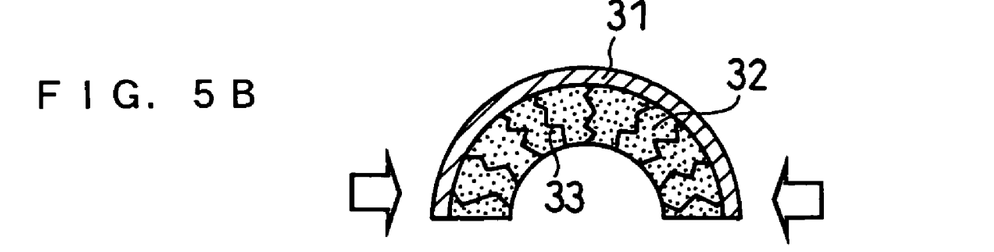
FIG. 5B is a schematic cross-sectional view of the electrode of the present invention upon winding.
Figure 6A:
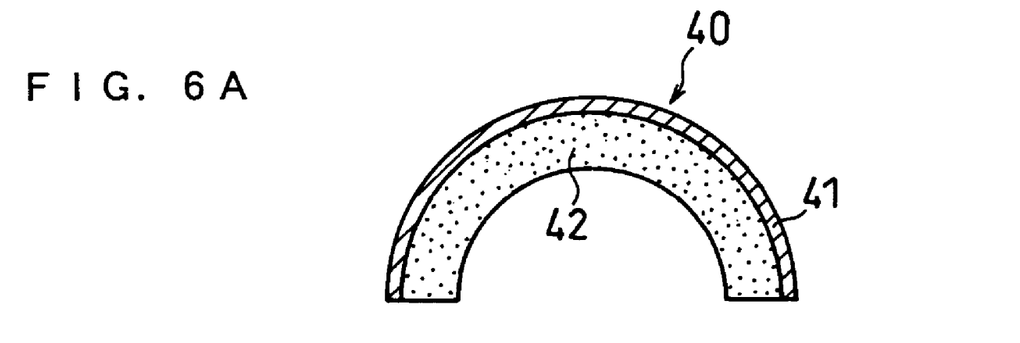
FIG. 6A is a schematic cross-sectional view of an electrode that has not been subjected to a bending process before winding.
Figure 6B:
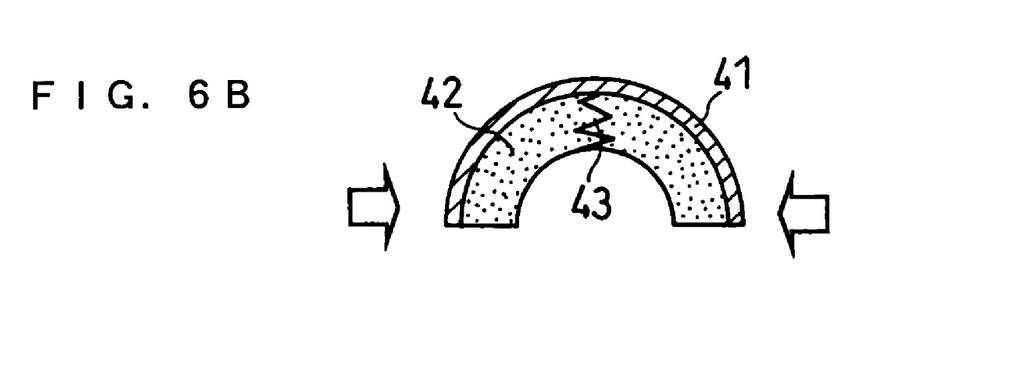
FIG. 6B is a schematic cross-sectional view of the electrode of FIG. 6A upon winding.

FIG. 5A schematically illustrates an electrode of the present invention that has been subjected to a bending process before winding, and FIG. 5B schematically illustrates the electrode of the present invention upon winding. FIG. 6A schematically illustrates an electrode that has not been subjected to such a bending process before winding, and FIG. 6B schematically illustrates the electrode upon winding. For the purpose of simplification, these figures illustrate only the electrode mixture layer on the inner side of the current collector.

In an electrode 30 of the present invention, an electrode mixture layer 32 has cracks 33 at regular intervals, and the cracks 33 extend from the surface of the electrode mixture layer 32 to a current collector 31. When the electrode 30 of FIG. 5A is wound, forces are exerted as shown by the arrows of FIG. 5B. However, since this winding stress is distributed to a large number of the cracks 33, the current collector 31 does not break.

On the other hand, in an electrode 40 that has not been subjected to a bending process, the winding stress is concentrated in one location as illustrated in FIG. 6B, thereby causing an electrode mixture layer 42 to have a crack 43 that extends from the surface thereof to a current collector 41 and causing the current collector 41 to become cracked at a location corresponding to the crack 43. As a result, the electrode 40 breaks.

The present invention is particularly effective for positive electrodes for use in non-aqueous electrolyte secondary batteries that are intended to provide high energy densities. For example, $LiCoO_2$ has a true density of 5.0 g/cc, and when it is used as the active material of a positive electrode plate, the density of the active material packed therein is approximately 3.4 g/cc. On the other hand, $LiNi_{1/3}Mn_{1/3}Co_{1/3}O_2$ and $LiNi_{0.85}Co_{0.10}Al_{0.05}O_2$ have a true density of 4.6 g/cc, and when they are used as the active materials of a positive electrode plate, the active material density is approximately 3.2 g/cc. These active materials with a Ni ratio of 20% or more relative to the metal elements are difficult to pack, and if they are packed at a density similar to that of $LiCoO_2$, the resultant electrode plate tends to become hard. Such hard electrode plates break easily upon winding. Hence, when they are subjected to a bending process according to the present invention, remarkable effects are obtained.

The present invention is applicable not only to positive electrodes but also negative electrodes whose electrode mixture layers are hard and peel easily.

The present invention is preferably applied to an electrode comprising a current collector made of a metal foil with a thickness of 5 to 30 μm and an electrode mixture layer carried on each side thereof, the electrode having a total thickness of 50 to 300 μm.

In the last bending step of the bending process of the present invention, the electrode is bent at a curvature that is equal to or slightly larger than that of the winding core onto which the electrode is to be wound. When using rollers for the bending process, the diameters of the rollers are made equal to or slightly smaller than that of the winding core.

The number of cracks formed in the electrode mixture layer of the electrode is mainly determined by the first bending step under the above-described conditions, and the depth of the cracks formed by the first bending step is preferably about 1/10 to 1/3 of the final depth of the cracks. It is desirable to perform a plurality of bending steps before the last bending step such that the cracks become gradually deeper, though the thickness of the electrode mixture layer needs to be considered.

It is preferred that the positive electrode plate to which the present invention is applied include: a positive electrode mixture comprising a lithium-containing composite oxide represented by the general formula $Li_xM_yN_{1-y}O_2$ (wherein M and N are at least one selected from the group consisting of Co, Ni, Mn, Cr, Fe, Mg, Al, and Zn, M≠N, $0.98 \leq x \leq 1.10$, $0 \leq y \leq 1$); and a current collector, made of an Al or Al alloy, carrying the electrode mixture. The positive electrode mixture preferably contains 0.2 to 50% by weight of a conductive agent relative to the positive electrode active material, more preferably 0.2 to 30% by weight. When the conductive agent is carbon or graphite, the content of the conductive agent is preferably 0.2 to 10% by weight relative to the positive electrode active material.

The binder to be added to the positive electrode mixture may be a thermoplastic resin or a thermosetting resin. Examples include polyethylene, polypropylene, polytetrafluoroethylene, polyvinylidene fluoride, styrene butadiene rubber, tetrafluoroethylene-hexafluoropropylene copolymer, tetrafluoroethylene-perfluoroalkylvinylether copolymer, vinylidene fluoride-hexafluoropropylene copolymer, vinylidene fluoride-chlorotrifluoroethylene copolymer, ethylene-tetrafluoroethylene copolymer, polychlorotrifluoroethylene, vinylidene fluoride-pentafluoropropylene copolymer, propylene-tetrafluoroethylene copolymer, ethylene-chlorotrifluoroethylene copolymer, vinylidene fluoride-hexafluoropropylene-tetrafluoroethylene copolymer, vinylidene fluoride-perfluoromethylvinylether-tetrafluoroethylene copolymer, ethylene-acrylic acid copolymer or ($Na^+$) ion cross-linked material thereof, ethylene-methacrylic acid copolymer or ($Na^+$) ion cross-linked material thereof, ethylene-methyl acrylate copolymer or ($Na^+$) ion cross-linked material thereof, and ethylene-methyl methacrylate copolymer or ($Na^+$) ion cross-linked material thereof. These materials are preferably used singly or in the form of a mixture.

The negative electrode plate preferably includes: a negative electrode mixture comprising a negative electrode active material that comprises a carbon material, a graphite material, an alloy, or a metal oxide, which is capable of charging/discharging Li; and a negative electrode current collector, made of Cu, Ni, or a Cu—Ni alloy, carrying the negative electrode mixture. Preferable binders include polyvinylidene fluoride, styrene-butadiene rubber, acrylonitrile-butadiene rubber, methyl methacrylate-butadiene rubber, methyl methacrylate-sodium methacrylate rubber, methyl methacrylate-lithium methacrylate rubber, ammonium methacrylate-lithium methacrylate rubber, and methyl methacrylate-lithium methacrylate-ammonium methacrylate rubber. These materials are preferably used singly or in the form of a mixture.

The separator is not particularly limited as long as it has a composition capable of withstanding the operating temperature range of lithium secondary batteries. However, it is common to use a single layer of microporous film comprising an olefin resin, such as polyethylene or polypropylene, or two or more layers thereof, and such modes are also preferable.

Exemplary solvents for the non-aqueous electrolyte include: cyclic carbonates such as ethylene carbonate, propylene carbonate, butylene carbonate, and vinylene carbonate; chain carbonates such as dimethyl carbonate, diethyl carbonate, ethyl methyl carbonate, and dipropyl carbonate; aliphatic carboxylic acid esters such as methyl formate, methyl acetate, methyl propionate, and ethyl propionate; γ-lactones such as γ-butyrolactone; chain ethers such as 1,2-dimethoxyethane, 1,2-diethoxyethane, and ethoxymethoxyethane; cyclic ethers such as tetrahydrofuran and 2-methyltetrahydrofuran; aprotic organic solvents such as dimethyl sulfoxide, 1,3-dioxolane, formamide, acetamide, dimethylformamide, dioxolane, acetonitrile, propylnitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, dimethyl sulfoxide, and N-methylpyrrolidone. These are used singly or in combination of two or more of them. Among them, a mixture of a cyclic carbonate and a chain carbonte or a mixture of a cyclic carbonate, a chain carbonte and an aliphatic carboxylic acid ester is preferred.

Exemplary lithium salts to be dissolved in these solvents include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, chloroborane lithium such as $LiB_{10}Cl_{10}$, lithium lower aliphatic carboxylate, LiCl, LiBr, LiI, lithium tetrachloroborate, lithium tetraphenylborate, and imides. They may be used singly or in combination of two or more of them. The inclusion of $LiPF_6$ is particularly preferred.

The best mode for carrying out the invention is hereinafter described with reference to drawings.

Figure 2:
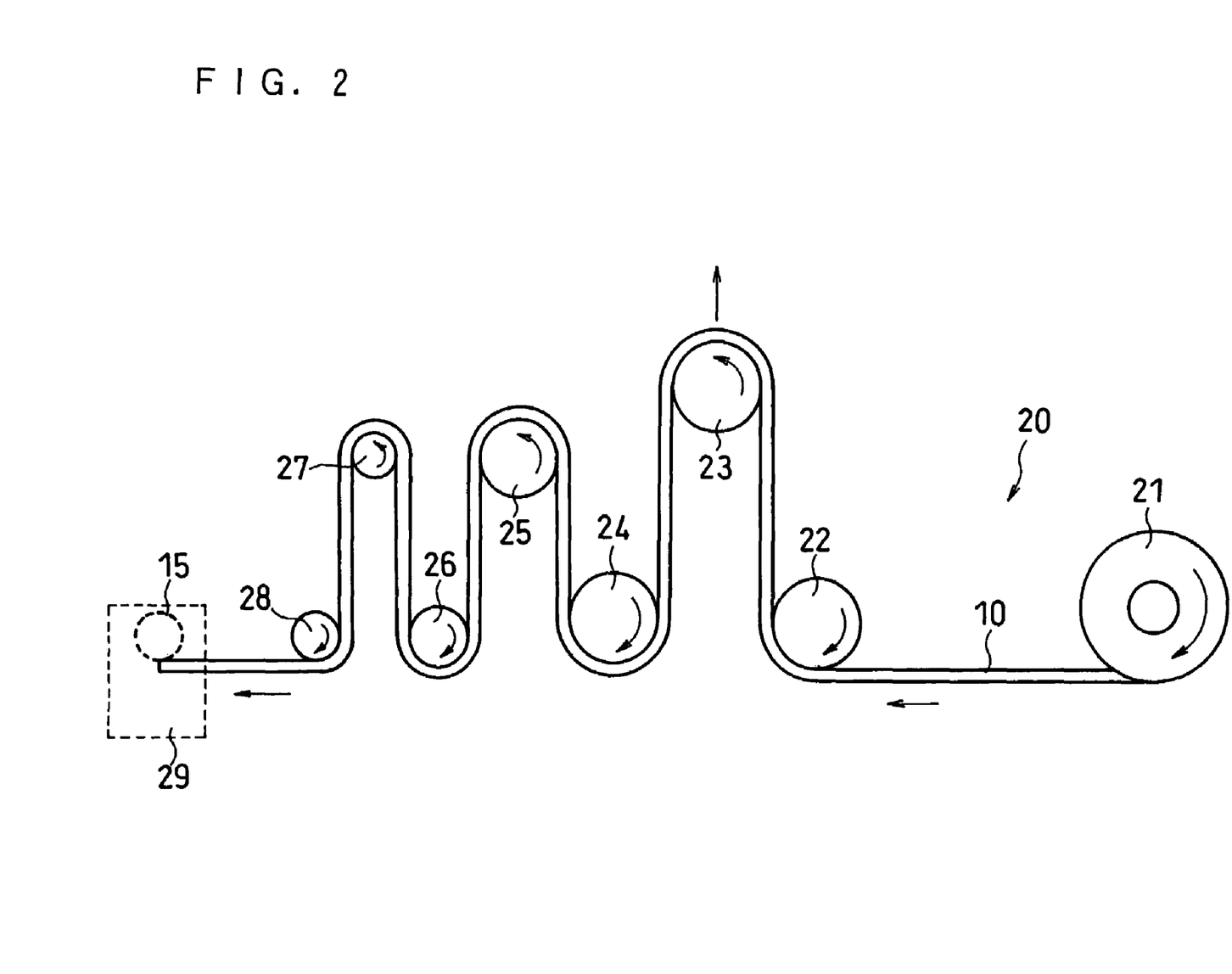
FIG. 2 illustrates an exemplary production step of an electrode for causing cracks in the electrode.

FIG. 1 is a cross-sectional view of the main part of an electrode in one embodiment of the present invention cut in the direction perpendicular to a winding core. FIG. 2 illustrates a manufacturing process for causing cracks in an electrode.

In one embodiment of the present invention, an electrode 10 is wound around a winding core 15. The electrode 10 includes a current collector 11 and an electrode mixture layer 12 carried on each side thereof, and at least the electrode mixture layer on the inner side of the current collector 11 has a large number of micro-cracks 13. These cracks of the electrode mixture layer preferably extend to the current collector 11.

A method for producing the electrode 10 with such cracks is described with reference to FIG. 2.

The electrode 10 has been previously wound around a roller 21. The electrode 10 unwound from the roller 21 is bent with a roller 22, a tension roller 23, and rollers 24, 25, 26, 27, and 28, and then transported to a section 29 for forming a spiral electrode assembly. Due to the winding force of the winding core 15 in the section 29, the electrode 10 is transported from the roller 21 to the roller 28. The axes of the respective rollers are parallel, and the axis of the tension roller 23 is movable upward and downward in this figure, whereby the tension exerted on the electrode is adjusted.

The diameters of the rollers gradually decrease toward the section 29. For example, the diameter of the roller 22 is 50 mm, the diameters of the rollers 23 and 24 are 30 mm, and the diameters of the rollers 25, 26, 27, and 28 are 15, 10, 5, and 4.5 mm, respectively. The diameter of the winding core 15 is 4.5 mm. It should be noted that these figures are intended only for illustration, and that the relative sizes of the respective elements are not necessarily correct. For example, the thickness of the electrode 10 illustrated therein is larger than the actual size, as compared with the roller 22, for example. Also, the diameter of the roller 21, from which the electrode is unwound, is significantly larger than that of, for example, the roller 22, and the electrode mixture layers of the electrode have no cracks when being wound around the roller 21.

By adjusting the position of the tension roller 23, an appropriate tension is applied to the electrode 10, and the electrode 10 is transported under tension as shown by the arrows of the figure. The electrode 10 first comes into contact with the roller 22 and is strongly pressed against about ¼ of the circumference of the roller 22. That is, the transport direction of the electrode is changed 90° by the roller 22. As a result, a large number of micro-cracks occur in the electrode mixture layer of the electrode 10. Although it depends on the roller diameter, the cracks formed by the first roller 22 will gradually become deeper by the subsequent rollers and ultimately extend to the current collector. After being passed though the tension roller 23, the electrode 10 is pressed against the rollers 24 to 27, whose diameters gradually decrease, about ½ the circumference of each roller. Lastly, the electrode 10 is pressed against the roller 28 having the same diameter as that of the winding core 15, ¼ the circumference thereof. In this way, desired cracks are formed in the electrode mixtures layer of the electrode. It should be noted that although the diameters of the rollers 24 to 27 gradually decrease, they may be the same. That is, in the case of using n rollers, the diameter $r_{n-1}$ of the n−1$^{th}$ roller and the diameter $r_n$ of the n$^{th}$ roller satisfy the relation: $r_n \leq r_{n-1}$.

The tension exerted on both ends of the part of the electrode in contact with the roller is preferably 20 to 200 gf/cm, though it varies with the strength of the current collector of the electrode. When the width of an electrode to be bent is 5 cm, the tension is preferably 100 to 1000 gf.

The positions of the cracks in the electrode mixture layer are mostly determined when the electrode is pressed against the first roller 22, and the depths of the cracks are gradually increased by the subsequent rollers whose diameters gradually decrease. Therefore, the diameter of the first roller 22 and the degree of contact of the electrode with the rollers are important. When the electrode has a large thickness, the diameter of the first roller 22 needs to be increased, so that the number of the subsequent rollers is also increased.

For example, suppose that the diameter of the roller 22 is 1000 times the thickness of the electrode, for example, the diameter is 100 mm when the thickness of the electrode is 100 µm. In this case, when the diameter of the roller 22 is twice or more than twice the diameter of the winding core, the subsequent rollers up to the roller 28, which has a diameter that is equal to or smaller than that of the winding core, desirably have diameters that gradually decrease by about 50%. Also, when the diameter of the first roller is less than twice the diameter of the winding core, the subsequent rollers up to the last roller 28 have diameters that gradually decrease by about 50%.

When the thickness of an electrode to be wound onto a winding core of 2.5 to 5 mm in diameter is 0.05 to 0.30 mm, it is preferred to cause cracks in the electrode mixture layer that is to be positioned inward when wound at intervals of 0.05 to 0.2 mm. In order to cause such cracks, it is preferred that the diameter of the roller 22 be 15 to 100 mm and that the electrode be pressed against the roller 22 at least ¼ the circumference thereof.

In FIG. 2, the tension roller 23 and four rollers 24 to 27 are provided between the roller 22 and the roller 28, and the electrode is pressed against each roller about ½ the circumference thereof. This is intended to gradually increase the depths of the cracks caused by the first roller 22 and, at the same time, to evenly cause cracks in the electrode mixture layers on both sides of the current collector by bending the electrode in the winding direction and the direction opposite to the winding direction. Also, by alternately bending the electrode in the winding direction and the opposite direction, the electrode can be transported smoothly and worked in a desired manner without requiring a long transport space. Thus, the number of the rollers may be selected as appropriate, depending on the thickness of the electrode mixture layers of the electrode, the diameter of the winding core, etc.

In FIG. 2, the diameter of the last roller 28 is the same as that of the winding core 15, but the diameter of the roller 28 may be slightly smaller than that of the winding core. The bending direction by the last roller 28 is preferably the same as the winding direction of the electrode.

Figure 3:
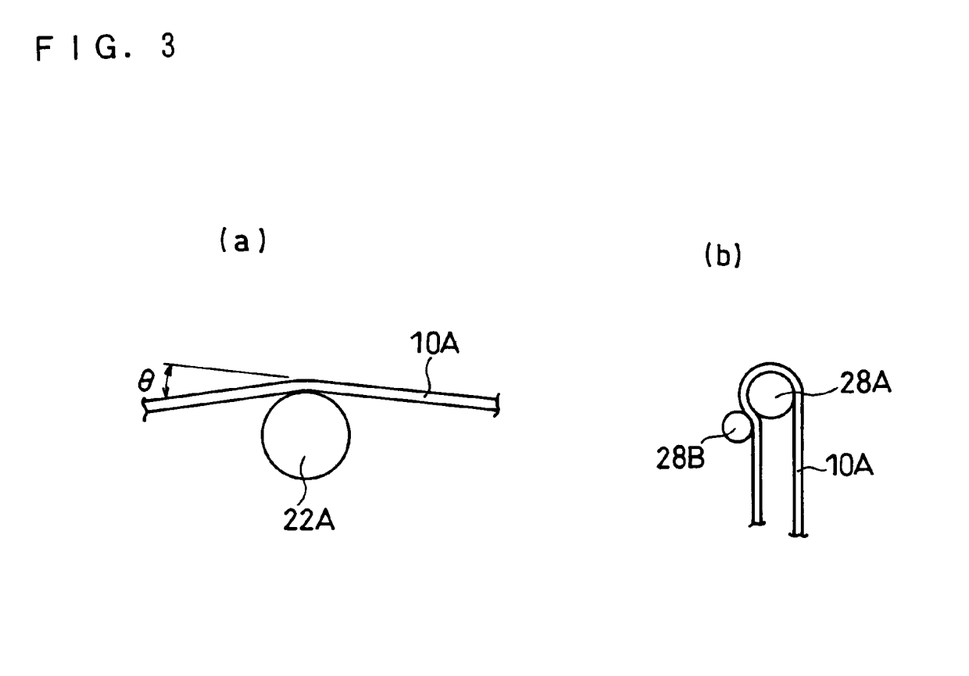
FIG. 3 illustrates exemplary modified production steps of an electrode for causing cracks in the electrode.

While FIG. 2 shows a preferable embodiment, FIG. 3 shows a modified embodiment.

FIG. 3(a) illustrates an exemplary first bending step of an electrode 10A. The transport direction of the electrode 10A is changed at an angle θ by a roller 22A. Even if the angle θ is a very small value, for example, about 1°, it can cause cracks in the electrode 10A.

In this case, the roller 22A does not necessarily have a larger diameter than that of the winding core. The roller 22A causes almost even cracks in the electrode mixture layer by changing the transport direction of the electrode. However, in the case of bending with a roller that has a smaller diameter than that of the winding core, if the angle at which the transport direction is changed is increased, the curvature of the bending becomes grater than that of the winding core. Therefore, in the case of bending with a roller having a smaller diameter, it is desirable that an electrode be partially brought into contact with the circumference of the roller.

FIG. 3(b) shows an exemplary bending step of the electrode 10A, where an auxiliary roller 28B is provided to more effectively bend the electrode 10A with a last roller 28A, and the electrode 10A is pressed against the roller 28A about ⅔ the circumference thereof. In the case of bending an electrode with the last roller of a plurality of rollers, the electrode is preferably pressed against the last roller at least ¼ the circumference thereof, as illustrated in FIG. 2. Specifically, it is preferred that the transport direction be at 90° or more. In FIG. 3(b), the electrode is pressed against the roller 28A approximately ⅔ the circumference thereof. It should be noted that the auxiliary roller 28B is designed to change the direction of the electrode 10A and that it does not contribute to the bending of the electrode 10A.

Figure 4:
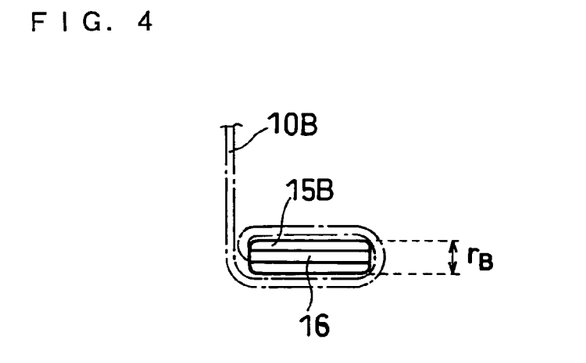
FIG. 4 schematically illustrates a step of winding an electrode onto a winding core that is flat in cross-section.

FIG. 2 has shown an instance in which the winding core is cylindrical and the electrode assembly is accommodated in a cylindrical battery case. However, the present invention is also applicable to an instance in which an electrode assembly fabricated by using a winding core that is flat and rectangular in cross-section is accommodated in a rectangular battery case. FIG. 4 schematically illustrates a step of winding an electrode 10B onto a winding core 15B that is flat and rectangular in cross-section. The winding core 15B has a slit 16 in the axial direction thereof, and the edge of the electrode 10B is fitted into the slit 16 and wound onto the winding core 15B. When such a winding core is used, the diameter of the core is defined as the shorter side $r_B$.

Examples of the present invention are hereinafter described.

EXAMPLE 1

Preparation of Positive Electrode Plate 100 parts by weight of lithium composite oxide $LiCoO_2$ was mixed with 4 parts by weight of acetylene black, serving as a conductive agent, and an N-methyl-2-pyrrolidone (hereinafter referred to as NMP) solution containing 4 parts by weight (solid content) of polyvinylidene fluoride (PVdF #1320, available from Kureha Chemical Industry Co., Ltd.), serving as a binder, and the mixture was kneaded to form a paste of electrode mixture. This paste was applied to both sides of a current collector made of a 15-μm-thick aluminum foil, dried at 110° C. to evaporate NMP, and rolled to a thickness of 200 μm. The true density of the $LiCoO_2$ was 5.0 g/cc (tap density 3.0 g/cc), and the density of the resultant electrode mixture layer was 3.6 g/cc. Subsequently, this was cut to a width of 50 mm, to prepare a positive electrode plate.

Thereafter, this positive electrode plate was subjected to a bending process.

This bending process was performed by using the apparatus as illustrated in FIG. 2. The diameters of the respective rollers are the same as those as described above with reference to FIG. 2. As a result, the electrode mixture layer to be positioned inward when wound had cracks at intervals of 90 to 100 mm, and these cracks extended from the surface of the electrode mixture layer to the current collector.

Preparation of Negative Electrode Plate 100 parts by weight of flake graphite, serving as the active material, was mixed with an aqueous dispersion containing 3 parts by weight (solid content) of styrene-butadiene rubber, serving as a binder, and 3 parts by weight of a sodium salt of carboxymethyl cellulose, serving as a thickener, to form a paste of electrode mixture. This paste was applied to both sides of a current collector made of a 15-μm-thick copper foil, dried at 110° C. to evaporate the water, and rolled to a thickness of 200 μm. Subsequently, this was cut to a width of 52 mm to prepare a negative electrode plate.

Inspection for Cracks

The positive electrode plate subjected to the bending process was cut in parallel with the winding direction and wound onto a core having the same diameter as that of a winding core that will be described later. In this state, the depths of the cracks in the electrode mixture layer of the electrode were measured. In order to facilitate the measurement of the crack depth, the electrode was colored with lead ions, and the colored electrode was subjected to an energy-dispersive elemental analysis for lead mapping. The detected depth of lead was defined as crack depth.

Production Method of Wound Electrode Assembly

A spiral electrode assembly was produced by winding the 50-mm-wide positive electrode plate subjected to the bending process, the 52-mm-wide negative electrode plate not subjected to the bending process, and a separator for separating these two plates around a winding core of 4.5 mm in diameter such that the positive electrode plate was positioned inward. The separator was a 20-μm-thick polyethylene porous film (available form Asahi Kasei Corporation). The porosity of the separator measured by a mercury porosimeter (available from Yuasa Ionics Inc.) was 45%. When the positive electrode plate, the negative electrode plate, and the separator were wound together to form the electrode assembly, a tension roller was disposed between each hoop and the winding location at which they were wound such that a tension of 200 gf was exerted on each of them. FIG. 2 shows the tension roller 23, which applies tension to the positive electrode.

Inspection Method of Electrode Used in Electrode Assembly for Breakage

The wound electrode assembly was unwound to separate the positive electrode plate, the negative electrode plate, and the separator. The positive electrode plate subjected to the bending process was examined for its breakage, the length of splits, and the like, to confirm the effect of the present invention in suppressing electrode breakage.

Production Method of Battery

A wound electrode assembly, which was prepared in the same manner as the electrode assembly subjected to the above-mentioned inspection, was placed in a stainless steel SUS battery case, and an electrolyte was injected therein. The opening of the battery case was sealed with a sealing plate with a positive electrode terminal and an insulating gasket.

The resultant cylindrical lithium secondary battery had a height of 65 mm, a diameter of 18 mm, and a design capacity of 1800 mAh. The non-aqueous electrolyte was prepared by dissolving $LiPF_6$ at 1 mol/l in a solvent mixture of ethylene carbonate and ethyl methyl carbonate in a volume ratio of 1:1.

COMPARATIVE EXAMPLE 1

In the apparatus of FIG. 2, a positive electrode was transported from the roller 24 to the section 29 without being passed through the rollers 25 to 28. A battery was produced under the same conditions as those of Example 1 except for the use of this positive electrode.

COMPARATIVE EXAMPLE 2

In the apparatus of FIG. 2, a positive electrode was transported from the roller 26 to the section 29 without being passed through the rollers 27 and 28. A battery was produced under the same conditions as those of Example 1 except for the use of this positive electrode.

COMPARATIVE EXAMPLE 3

In the apparatus of FIG. 2, a positive electrode was pressed against ¼ of the circumference of the roller 28 as a bending process without being passed through the rollers 22 to 27. A battery was produced under the same conditions as those of Example 1 except for the use of this positive electrode.

EXAMPLE 2

A positive electrode with an electrode mixture density of 3.2 g/cc was produced by using $LiNi_{1/3}Mn_{1/3}Co_{1/3}O_2$ with a true density of 4.6 g/cc (tap density 2.8 g/cc) as the positive electrode active material. This positive electrode was subjected to the same bending process as that of Example 1.

EXAMPLE 3

A positive electrode with an electrode mixture density of 3.2 g/cc was produced by using $LiNi_{0.85}Co_{0.10}Al_{0.05}O_2$ with a true density of 4.6 g/cc (tap density 2.8 g/cc) as the positive electrode active material. This positive electrode was subjected to the same bending process as that of Example 1.

EXAMPLES 4 TO 14

Positive electrodes with an electrode mixture density of 3.3 g/cc were prepared by using the positive electrode active material mixtures of Examples 1 to 3 as shown in Table 1. These positive electrodes were subjected to the same bending process as that of Example 1.

TABLE 1

|  | Mixing ratio of active material A:B:C | Bending process |
|---|---|---|
| Example 1 | 1:0:0 |  |
| Example 2 | 0:1:0 | Same as Example 1 |
| Example 3 | 0:0:1 | Same as Example 1 |
| Example 4 | 1:5:0 | Same as Example 1 |
| Example 5 | 1:3:0 | Same as Example 1 |
| Example 6 | 1:1:0 | Same as Example 1 |
| Example 7 | 3:1:0 | Same as Example 1 |
| Example 8 | 5:1:0 | Same as Example 1 |
| Example 9 | 1:0:5 | Same as Example 1 |
| Example 10 | 1:0:3 | Same as Example 1 |
| Example 11 | 1:0:1 | Same as Example 1 |
| Example 12 | 3:0:1 | Same as Example 1 |
| Example 13 | 5:0:1 | Same as Example 1 |
| Example 14 | 1:1:1 | Same as Example 1 |
| Example 15 | 1:0:0 |  |

In Table 1 and Table 2,
"A" represents $LiCoO_2$,
"B" represents $LiNi_{1/3}Mn_{1/3}Co_{1/3}O_2$, and
"C" represents $LiNi_{0.85}Co_{0.10}Al_{0.05}O_2$.

EXAMPLE 15

A positive electrode was produced in the same manner as in Example 1, except that the diameter of the roller 28 of the apparatus of FIG. 2 was changed to 3.5 mm. This positive electrode was subjected to the same bending process as that of Example 1.

COMPARATIVE EXAMPLES 4 TO 20

These comparative examples are the same as Example 1, except for the use of positive electrode active materials and positive electrodes subjected to bending processes as shown in Table 2.

TABLE 2

|  | Mixing ratio of active material A:B:C | Bending process |
|---|---|---|
| Comparative Example 1 | 1:0:0 |  |
| Comparative Example 2 | 1:0:0 |  |
| Comparative Example 3 | 1:0:0 |  |
| Comparative Example 4 | 0:1:0 | Same as Comparative Example 1 |
| Comparative Example 5 | 0:1:0 | Same as Comparative Example 2 |
| Comparative Example 6 | 0:1:0 | Same as Comparative Example 3 |
| Comparative Example 7 | 0:0:1 | Same as Comparative Example 1 |
| Comparative Example 8 | 0:0:1 | Same as Comparative Example 2 |
| Comparative Example 9 | 0:0:1 | Same as Comparative Example 3 |
| Comparative Example 10 | 1:5:0 | Same as Comparative Example 1 |
| Comparative Example 11 | 1:3:0 | Same as Comparative Example 1 |
| Comparative Example 12 | 1:1:0 | Same as Comparative Example 1 |

TABLE 2-continued

|  | Mixing ratio of active material A:B:C | Bending process |
|---|---|---|
| Comparative Example 13 | 3:1:0 | Same as Comparative Example 1 |
| Comparative Example 14 | 5:1:0 | Same as Comparative Example 1 |
| Comparative Example 15 | 1:0:5 | Same as Comparative Example 1 |
| Comparative Example 16 | 1:0:3 | Same as Comparative Example 1 |
| Comparative Example 17 | 1:0:1 | Same as Comparative Example 1 |
| Comparative Example 18 | 3:0:1 | Same as Comparative Example 1 |
| Comparative Example 19 | 5:0:1 | Same as Comparative Example 1 |
| Comparative Example 20 | 1:1:1 | Same as Comparative Example 1 |

Each of the batteries thus produced was charged at a constant voltage of 4.2 V (maximum current 1 A) in an environment at 25° C. for 30 minutes and then discharged at a constant current of 0.2 A down to a cut-off voltage of 3.0 V. In this way, the initial capacity was obtained. Also, each battery was subjected to repeated cycling of charging at a constant voltage of 4.2 V (maximum current 1 A) in an environment at 25° C. for 30 minutes and then discharging at a constant current of 1 A down to a cut-off voltage of 3.0 V. In this way, the cycle characteristic (capacity retention rate relative to initial capacity) was obtained.

Also, positive electrode plates subjected to the bending process were examined for their ability to absorb electrolyte, by immersing them in an electrolyte for 1 minute and measuring their weight increase one minute after pulling them up. The electrodes used for this comparison of electrolyte absorption had a width of 30 mm and a length of 200 mm.

These results are shown in Table 3 together with the depths of cracks caused by the bending process and the state of electrode breakage which were inspected in the above manner. In Comparative Examples 10 to 20, their electrodes completely broke in the direction of the width during the winding step and could not be used to assemble batteries. The amount of electrolyte absorbed was 1.0 to 1.3 g.

TABLE 3

|  | Initial Capacity (mAh) | Capacity retention rate at 500th cycle (%) | Crack depth (%) | Breakage | Amount of electrolyte absorbed (g) |
|---|---|---|---|---|---|
| Example 1 | 1990 | 85 | 100 | Not broken | 2.3 |
| Example 2 | 1990 | 87 | 100 | Not broken | 2.0 |
| Example 3 | 2000 | 87 | 100 | Not broken | 2.0 |
| Example 4 | 1990 | 83 | 100 | Not broken | 2.1 |
| Example 5 | 1990 | 85 | 100 | Not broken | 2.2 |
| Example 6 | 1990 | 86 | 100 | Not broken | 2.2 |
| Example 7 | 1990 | 83 | 100 | Not broken | 2.2 |
| Example 8 | 1990 | 85 | 100 | Not broken | 2.2 |
| Example 9 | 2000 | 84 | 100 | Not broken | 2.1 |
| Example 10 | 2000 | 83 | 100 | Not broken | 2.2 |
| Example 11 | 1995 | 86 | 100 | Not broken | 2.2 |
| Example 12 | 1995 | 87 | 100 | Not broken | 2.2 |
| Example 13 | 1990 | 86 | 100 | Not broken | 2.2 |
| Example 14 | 1990 | 86 | 100 | Not broken | 2.2 |
| Example 15 | 1990 | 93 | 100 | Not broken | 2.3 |
| Comparative Example 1 | * | — | — | Completely broken in width direction | 1.2 |
| Comparative Example 2 | 1990 | Capacity lowered to 1% during cycling | 70 | 50% broken in width direction | 2.4 |
| Comparative Example 3 | * | — | Current collector broken | 50% broken in width direction | 1.3 |
| Comparative Example 4 | * | — | — | Completely broken in width direction | 1.3 |
| Comparative Example 5 | 1990 | Capacity lowered to 1% during cycling | 60 | 40% broken in width direction | 2.3 |
| Comparative Example 6 | * | — | Current collector broken | 25% broken in width direction | 1.3 |
| Comparative Example 7 | * | — | — | Completely broken in width direction | 1.3 |
| Comparative Example 8 | 1990 | Capacity lowered to 1% during cycling | 60 | 50% broken in width direction | 2.2 |
| Comparative Example 9 | * | — | — | 25% broken in width direction | 1.3 |

* Due to electrode breakage during winding, a battery could not be assembled.

As in Example 1, the electrodes subjected to the bending process according to the present invention were free from breakage in the winding step and exhibited desired battery characteristics. An observation of a cross-section of each electrode before the winding step showed that the cracks of the electrode mixture layer were deep enough to reach the current collector surface. It was thus confirmed that these cracks of the electrode mixture layer that were deep enough to reach the current collector surface scattered the bending stress exerted on the electrode in the winding step, thereby making it possible to suppress the breakage of the electrode. It was also confirmed that the method of the present invention enables formation of desired cracks in electrodes.

On the other hand, in Comparative Example 1 where the bending process of the present invention was not performed, no cracks with a sufficient depth were observed in a cross-section of the electrode. Also, when the electrode assembly was unwound to measure the size of electrode breakage, the electrode was found to be broken at a position approximately 8 mm from the end close to the winding core.

The electrodes subjected to the bending process were compared in terms of the ability to absorb electrolyte, and the comparison showed that the electrode of Example 1 has a large ability to absorb electrolyte. This can heighten the permeation speed of the electrolyte into the electrode, thereby increasing the amount of the electrolyte held by the electrode and improving the cycle characteristics. Also, this can help reduce the time of the electrolyte injection step.

Also, in Example 15 where in the last stage of the bending process, the electrode was bent with the roller of 3.5 mm in diameter, which was smaller than the 4.5-mm-diameter of the winding core, the current collector was not damaged in the bending process and the breakage of the electrode was suppressed in the winding step.

On the other hand, in Comparative Example 2 where in the last stage of the bending process, the diameter of the roller was larger than that of the winding core, the bending process was insufficient. Hence, the cracks of the electrode mixture layer were not deep enough to extend to the current collector surface, and partial breakage occurred in the width direction. In the battery including such an electrode, the electrode was broken at this breakage due to the impact of electrode expansion/contraction during charge/discharge, so that the battery capacity lowered significantly during the evaluation of cycle characteristics.

In Comparative Example 3 where the bending process was performed with only one roller whose diameter was equal to that of the winding core, an observation of a cross-section of the electrode revealed that during the bending process with the roller, the current collector was already partially broken.

In Examples 2 to 14, $LiNi_{1/3}Mn_{1/3}Co_{1/3}O_2$ or $LiNi_{0.85}Co_{0.10}Al_{0.05}O_2$, which has a lower true or tap density and a lower packing rate of active material than $LiCoO_2$ was used as the positive electrode active material, and the bending process was performed in the same manner as in Example 1. In these examples, the cracks of the electrode mixture layer were deep enough to reach the current collector surface, and these cracks allowed the bending stress to be scattered sufficiently upon winding. On the other hand, in Comparative Examples 2 to 20, their electrodes were completely or partially broken in the winding step, since they did not have such preferable cracks as those of the present invention.

EXAMPLE 16

A positive electrode and a negative electrode were produced in the same manner as in Example 1, but the positive electrode had a width of 42 mm and the negative electrode had a width of 43 mm. The positive electrode was subjected to a bending process in the same manner as in Example 1 by using the apparatus of FIG. 2, except that the diameter of the last roller was changed to 4.5 mm. The positive and negative electrodes thus produced and a separator were wound together onto a flat winding core having a longer side of 25 mm and a shorter side of 4.5 mm to form an electrode assembly, and a rectangular battery of 50×34×5.2 mm was produced. This battery had an initial capacity of 920 mAh and a capacity retention rate at the 500th cycle of 95%. Meanwhile, a positive electrode produced in the same manner as the above was subjected to a bending process in the same manner as in Comparative Example 1, and then wound with a negative electrode and a separator. However, during the winding, this positive electrode completely broke in the direction of the width and could not be used to assemble a battery.

As described above, according to the present invention, no electrode breakage occurs in the winding step for forming an electrode assembly. Therefore, the diameter of a winding core can be reduced to increase the energy density of the battery. The present invention is particularly applicable to high-energy-density non-aqueous electrolyte secondary batteries for use in portable appliances and cordless appliances.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A method for producing an electrode for a non-aqueous electrolyte secondary battery, said electrode being in sheet form and designed to be spirally wound onto a winding core together with an electrode of opposite polarity and a separator, said method comprising the steps of:
forming an electrode mixture layer on each side of a current collector, to produce an electrode in sheet form; and
bending said electrode in the longitudinal direction thereof, to cause a large number of cracks in at least the electrode mixture layer on the winding core side such that the cracks extend from the surface of the electrode mixture layer to the current collector in the direction intersecting with the longitudinal direction of the electrode, wherein said step of bending the electrode comprises the steps of:
bending the electrode at a curvature that is smaller than that of said winding core at least once; and
thereafter bending the electrode at a curvature that is equal to or larger than that of said winding core.

2. A method for producing an electrode for a non-aqueous electrolyte secondary battery, said electrode being in sheet form and designed to be spirally wound onto a winding core together with an electrode of opposite polarity and a separator, said method comprising the steps of:
forming an electrode mixture layer on each side of a current collector, to produce an electrode in sheet form; and
bending said electrode in the longitudinal direction thereof by transporting said electrode in the longitudinal direction while changing the transport direction of the electrode under tension with a plurality of rollers, to cause a large number of cracks in at least the electrode mixture layer on the winding core side such that the cracks extend from the surface of the electrode mixture layer to the current collector in the direction intersecting with the longitudinal direction of the electrode, wherein said step of bending the electrode comprises the steps of:

changing the transport direction of the electrode with at least one roller that is larger in diameter than said winding core; and thereafter changing the transport direction of the electrode with a roller that is equal to or smaller in diameter than said winding core.

3. The method for producing an electrode for a non-aqueous electrolyte secondary battery in accordance with claim 2, wherein said step of bending the electrode comprises the steps of:

changing the transport direction of the electrode with a plurality of rollers that are disposed such that the diameters of the rollers decrease sequentially in the transport direction of the electrode; and thereafter changing the transport direction of the electrode with a roller that is equal to or smaller in diameter than said winding core.

* * * * *